United States Patent Office 2,812,346
Patented Nov. 5, 1957

2,812,346
PROCESS FOR PREPARING VINYL KETONE ADDUCTS

Martin W. Farrar, Webster Groves, Mo., assignor to Monsanto Chemical Company, St. Louis, Mo., a corporation of Delaware No Drawing. Application January 27, 1954,
Serial No. 406,579

11 Claims. (Cl. 260—468)

This invention relates to the preparation of vinyl ketone adducts of 1-hydroxymethylene-2-keto-4a-methyl-$\Delta^3$-polyhydronaphthalenes.

In the preparation of vinyl ketone adducts of the structural formula

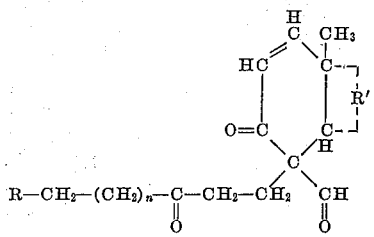

it has been customary to react a 1-hydroxymethylene-2-keto-4a-methyl-$\Delta^3$-polyhydronaphthalene of the structural formula

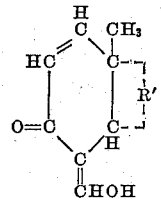

where R' is a 4-carbon atom chain such as

—CH$_2$—CH$_2$—CH$_2$—CH$_2$—

—CH$_2$—CH=CH—CH$_2$ and

—CH$_2$—CH$_2$—CH=CH— which chain links adjacent or ortho carbon atoms of the nucleus as described with a vinyl ketone of the formula

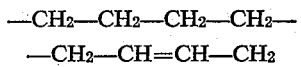

where $n$ is an integer from 0 to 2 inclusive and where R is hydrogen or a carboalkoxy group (alkyl—O—C—)
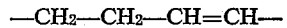

in the presence of an alkali metal alkoxide. However, the yields have been found to be poor and the catalyst difficult to handle. Since such vinyl ketone adducts upon treatment with a suitable agent ring close to provide polyhydrophenanthrene compounds which are important intermediates in the synthesis of steroidal compounds of the cyclopentanopolyhydrophenanthrene series, the art has sought means to provide a commercially feasible process.

According to the process of this invention vinyl ketone adducts of 1-hydroxymethylene-2-keto-4a-methyl-$\Delta^3$-polyhydronaphthalenes are prepared by reacting a 1-hydroxymethylene - 2 - keto - 4a - methyl - $\Delta^3$ - polyhydronaphthalene, such as 1 - hydroxymethylene - 2 - keto - 4a - methyl - $\Delta^3$ - octahydronaphthalene 1 - hydroxymethylene - 2 - keto - 4a - methyl - $\Delta^{3,5}$ - hexahydronaphthalene 1 - hydroxymethylene - 2 - keto - 4a - methyl - $\Delta^{3,6}$ - hexahydronaphthalene 1 - hydroxymethylene - 2 - keto - 4a - methyl - $\Delta^{3,7}$ - hexahydronaphthalene with a vinyl ketone of the aforedescribed formula in the presence of a quaternary ammonium alkoxide of the formula

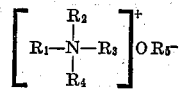

where R$_1$, R$_2$, R$_3$ and R$_4$ are hydrocarbon groups such as alkyl (e. g. methyl, ethyl, propyl, butyl, amyl, hexyl, octyl, etc.), cycloalkyl (e. g. cyclopentyl, cyclohexyl), and aralkyl (e. g. benzyl, phenethyl, etc.) and where R$_5$ is alkyl (e. g. methyl, ethyl, propyl, butyl, amyl, hexyl, octyl, etc.). This new process provides a means whereby the vinyl ketone adducts are prepared conveniently, economically and in improved yields over that employed heretofore.

As will be obvious to those skilled in the art the 1-hydroxymethylene - 2 - keto - 4a - methyl - $\Delta^3$ - polyhydronaphthalene reactants of this invention have two asymmetric carbon atoms and thusly exist in the form of four optically active isomers or as two racemates (i. e. cis and transracemic mixtures of dextro and levo rotatory isomers). All such forms of the reactants in any and all possible combinations are contemplated by this invention. The terms cis and trans as used herein indicate the spatial configuration of CH$_3$ and H at positions 4a and 8a respectively in the structural formula.

The process of this invention is carried out in an anhydrous media and in the presence of an inert organic solvent such as benzene, toluene, dioxane, isopropanol, butanol, isobutanol, tert. butanol, pentasol, etc. In general temperatures in the range of 0 to 60° C. can be employed, however, it is preferred that the reaction temperature be about 10 to 30° C.

As illustrative of the preparation of the vinyl ketone adduct of a 1-hydroxymethylene-2-keto-4a-methyl-polyhydronaphthalene is the following

Example I

To a suitable reaction vessel is added 100 grams of dl - trans - 1 - hydroxymethylene - 2 - keto - 4a - methyl-$\Delta^{3,6}$-hexahydronaphthalene

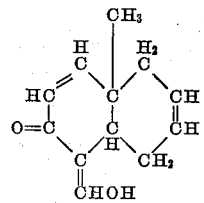

approximately 60 grams of ethyl vinyl ketone and approximately 273 grams of tert. butanol. Upon agitating a homogeneous solution results. The air of the system is replaced by nitrogen and to the solution is added with agitation approximately 30 cubic centimeters of 20% benzyl trimethyl ammonium n-butoxide in n-butanol. Thereupon approximately 78 grams of tert. butanol is added with agitation and the mix permitted to stand at room temperature for 72 hours. The resultant mass is filtered and the collected residue washed with petroleum ether. The residue (103 grams, 72% of theory yield), a white crystalline material, is *dl*-trans-1-formyl-1-(3-ketopentyl)-2-keto-4a-methyl-Δ$^{3,6}$-hexahydronaphthalene.

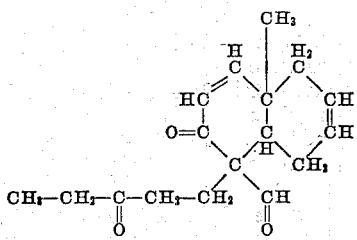

This vinyl ketone adduct upon treatment with potassium hydroxide in aqueous dioxane ring closes to form *dl*-anti-trans - 1,8a - dimethyl - Δ$^{6,9,10a(1)}$ - octahydrophenanthren-2-one (M. P. 72–73° C.).

In a similar manner but employing methyl vinyl ketone in Example I in place of ethyl vinyl ketone an improved yield of *dl*-trans-1-formyl-1-(3-ketobutyl)-2-keto-4a-methyl-Δ$^{3,6}$-hexahydronaphthalene is obtained. This vinyl ketone adduct upon treatment with potassium hydroxide in aqueous dioxane ring closes to form *dl*-anti-trans-8a-methyl-Δ$^{6,9,10a(1)}$-octahydrophenanthren-2-one (M. P. 76–80° C.).

*Example II*

Employing the process of Example I but replacing *dl*-trans-1-hydroxymethylene - 2 - keto-4a-methyl-Δ$^{3,6}$-hexahydronaphthalene with the levo-rotatory isomer of trans-1-hydroxymethylene - 2 - keto-4a-methyl-Δ$^{3,6}$-hexahydronaphthalene there is obtained substantially the same yield of the crystalline levo-rotatory isomer of trans-1-formyl-1-(3-ketopentyl)-2-keto - 4a - methyl-Δ$^{3,6}$-hexahydronaphthalene (M. P. 97–99° C.). This isomer upon treatment with potassium hydroxide in aqueous dioxane ring closes to form the white crystalline levo-rotatory isomer of anti-trans - 1,8a - dimethyl-Δ$^{6,9,10a(1)}$-octahydrophenanthren-2-one.

*Example III*

Employing the process of Example I but replacing *dl*-trans-1-hydroxymethylene - 2 - keto-4a-methyl-Δ$^{3,6}$-hexahydronaphthalene with *dl*-cis-1-hydroxymethylene-2-keto-4a-methyl-Δ$^{3,6}$-hexahydronaphthalene there is obtained a good yield of *dl*-cis-1-formyl-1-(3-ketopentyl)-2-keto-4a-methyl-Δ$^{3,6}$-hexahydronaphthalene.

*Example IV*

To a suitable reaction vessel is added 35 grams of the levo-rotatory isomer of trans-1-hydroxymethylene-2-keto-4a-methyl-Δ$^{3,6}$-hexahydronaphthalene, approximately 17.5 grams of methyl vinyl ketone and approximately 97.5 grams of tert. butanol. The mix is agitated and cooled to 0° C. The air of the system is replaced by nitrogen and with agitation there is added 30 cubic centimeters of 29.8% benzyl trimethyl ammonium n-butoxide in n-butanol. Thereupon approximately 29 grams of tert.-butanol is added with agitation over about 30 minutes. The mix is then held at about 5–10° C. for one hour and then permitted to stand at room temperature for about 16 hours. The solution is seeded with the levo-rotatory isomer of trans-1-formyl-1-(3-ketobutyl)-2-keto-4a-methyl-Δ$^{3,6}$-hexahydronaphthalene. To the so seeded reaction mass is added approximately 105 grams of petroleum ether with agitation and the mass is permitted to stand for about 72 hours at room temperature. The resultant mass is filtered, washed with petroleum ether and dried. The residue (38.8 grams, 81% of theory yield), a white crystalline material is the levo-rotatory isomer of trans-1-formyl-1-(3 - ketobutyl)-2-keto-4a-methyl-Δ$^{3,6}$-hexahydronaphthalene. This vinyl ketone adduct upon treatment with potassium hydroxide ring closes to form the levo-rotatory isomer of anti-trans-8a-methyl-Δ$^{6,9,10a(1)}$-octahydrophenanthren-2-one.

*Example V*

To a suitable reaction vessel is added approximately 53 grams of 5-keto-6-heptenoic acid methyl ester

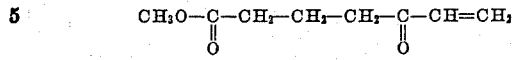

approximately 50 grams of the levo-rotatory isomer of trans-1-hydroxymethylene - 2 - keto-4a-methyl-Δ$^{3,6}$-hexahydronaphthalene and approximately 55 grams of tert. butanol. The air of the system is replaced by nitrogen and with agitation there is added 9 cubic centimeters of 30% benzyl trimethyl ammonium n-butoxide in n-butanol. Thereupon approximately 13 grams of tert. butanol is added with agitation. The mix is then allowed to stand at room temperature for about 42 hours. The solution is seeded with the levo-rotatory isomer of trans-1-formyl-1-(3,7-diketo - 7 - methoxyheptyl)-2-keto-4a-methyl-Δ$^{3,6}$-hexahydronaphthalene. An equal volume of petroleum ether is added with agitation while cooling to about 0° C. The mass is filtered and the residue washed with iso-propanol. Upon drying 40.5 grams of a white crystalline substance melting at 60–64° C. identified as the levo-rotatory isomer of trans-1-formyl-1-(3,7-diketo-7-methoxyheptyl)-2 - keto-4a-methyl-Δ$^{3,6}$-hexahydronaphthalene

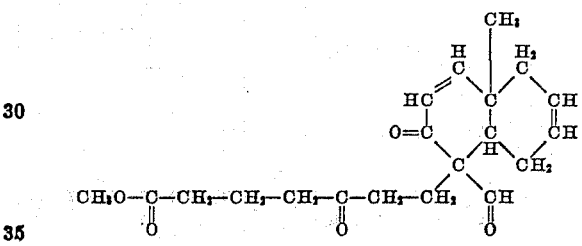

is obtained. This vinyl ketone adduct upon treatment with potassium hydroxide ring closes to form the levo-rotatory isomer of anti-trans-1-(3-methoxy-3-ketopropyl)-8a-methyl-Δ$^{6,9,10a(1)}$-octahydrophenanthren-2-one which upon hydrolyzing forms the keto acid, i. e. levo-anti-trans-1-(β - carboxyethyl)-8a-methyl-Δ$^{6,9,10a(1)}$-octahydrophenanthren-2-one.

Employing other alkyl esters of 5-keto-6-heptenoic acid such as the ethyl, propyl, butyl, etc., in the process described in Example V the corresponding 1-formyl-1-(3,7-diketo-7-alkoxyheptyl)-2 - keto-4a-methyl-Δ$^{3,6}$-hexahydronaphthalene is obtained.

The catalysts of this invention may be employed in any amount sufficient to catalyze the reaction. It has been found convenient to incorporate the catalyst in the reaction mass in the form of an alcoholic solution thereof. Of the new family of catalysts of the process of this invention the preferred group are those of structural formula

where $R_1$, $R_2$ and $R_3$ are straight chain alkyl radicals containing 1 to 4 carbon atoms, where $R_4$ is benzyl, and where $R_5$ is a branched or straight chain alkyl radical containing 2–6 carbon atoms. As illustrative of operable catalysts are Tetraethyl ammonium isopropoxide
Tetraethyl ammonium n-butoxide
Tetraethyl ammonium isobutoxide
Tetra n-propyl ammonium n-butoxide
Trimethyl benzyl ammonium n-butoxide
Trimethyl benzyl ammonium isobutoxide
Triethyl benzyl ammonium n-butoxide
Triethyl benzyl ammonium isobutoxide
Dimethyl dibenzyl ammonium n-butoxide
Dimethyl dibenzyl ammonium tert. butoxide
Diethyl dibenzyl ammonium n-butoxide While the quantities of reactants of this invention will vary widely such will depend upon the particular reactants involved. It is preferred that a slight excess of the theoretical amount of the vinyl ketone reactant, preferably not more than a 20% mol. excess, be employed.

While this invention has been described with respect to certain embodiments it is not so limited and it is to be understood that variations and modifications thereof may be made without departing from the scope or spirit of this invention.

What is claimed is:

1. In the method of making a vinyl ketone adduct of the structural formula

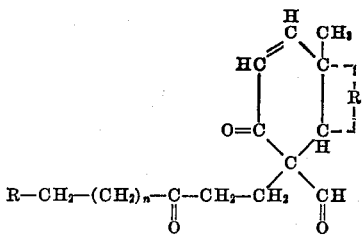

the step which comprises reacting in an anhydrous medium a vinyl ketone of the formula

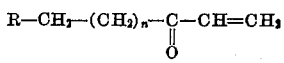

where $n$ is an integer from 0 to 2 inclusive and where R is selected from the group consisting of hydrogen and carboalkoxy groups whose alkyl substituents are lower alkyl radicals with a 1-hydroxymethylene - 2 - keto - 4a-methyl - $\Delta^3$ - polyhydronaphthalene of the structural formula

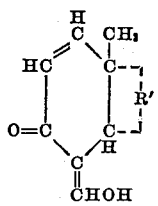

where R' is a 4-carbon atom chain containing as sole substituents from 6 to 8 hydrogen atoms in the presence of a quarternary ammonum alkoxide of the formula

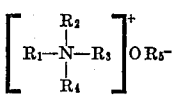

where $R_1$, $R_2$, $R_3$ and $R_4$ are hydrocarbon groups containing not more than eight carbon atoms selected from the group consisting of alkyl, cycloalkyl and aralkyl and where $R_5$ is an alkyl radical containing not more than eight carbon atoms.

2. In the method of making a vinyl ketone adduct of the structural formula

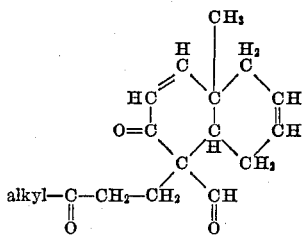

the step which comprises reacting in an anhydrous inert organic solvent medium a vinyl ketone of the formula

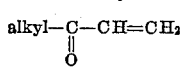

wherein the alkyl group contains not more than two carbon atoms with 1-hydroxymethylene-2-keto-4a-methyl- $\Delta^{3,6}$ - hexahydronaphthalene in the presence of a quaternary ammonium alkoxide of the formula

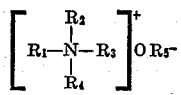

where $R_1$, $R_2$ and $R_3$ are straight chain alkyl radicals containing 1–4 carbon atoms, where $R_4$ is benzyl, and where $R_5$ is an alkyl radical containing 2–6 carbon atoms.

3. In the method of making a trans-1-formyl-1-(3-ketopentyl) - 2 - keto - 4a - methyl - $\Delta^{3,6}$ - hexahydronaphthalene the step which comprises reacting in an anhydrous inert organic solvent medium ethyl vinyl ketone with a trans-1-hydroxymethylene-2-keto-4a-methyl- $\Delta^{3,6}$ - hexahydronaphthalene in the presence of a quaternary ammonium butoxide of the formula

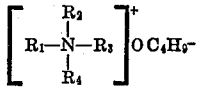

where $R_1$, $R_2$ and $R_3$ are straight chain alkyl radicals containing 1 to 4 carbon atoms and where $R_4$ is benzyl.

4. In the method of making a trans-1-formyl-1-(3-ketobutyl) - 2 - keto - 4a - methyl - $\Delta^{3,6}$ - hexahydronaphthalene the step which comprises reacting in an anhydrous inert organic solvent medium methyl vinyl ketone with a trans - 1 - hydroxymethylene - 2 - keto - 4a - methyl- $\Delta^{3,6}$ - hexahydronaphthalene in the presence of a quaternary ammonium butoxide of the formula

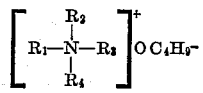

where $R_1$, $R_2$ and $R_3$ are straight chain alkyl radicals containing 1 to 4 carbon atoms and where $R_4$ is benzyl.

5. In the method of making a trans-1-formyl-1-(3,7-diketo - 7 - methoxyheptyl) - 2 - keto - 4a - methyl - $\Delta^{3,6}$-hexahydronaphthalene the step which comprises reacting in an anhydrous inert organic solvent medium the methyl ester of 5 - keto - 6 - heptenoic acid with a trans - 1-hydroxymethylene - 2 - keto - 4a - methyl - $\Delta^{3,6}$ - hexahydronaphthalene in the presence of a quaternary ammonium butoxide of the formula

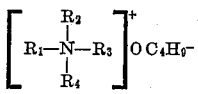

where $R_1$, $R_2$ and $R_3$ are straight chain alkyl radicals containing 1 to 4 carbon atoms and where $R_4$ is benzyl.

6. In the method of making the levo-rotatory isomer of trans - 1 - formyl - 1 - (3 - ketopentyl) - 2 - keto-4a - methyl - $\Delta^{3,6}$ - hexahydronaphthalene the step which comprises reacting in an anhydrous inert organic solvent medium and at a temperature in the range of about 10 to 30° C. ethyl vinyl ketone with the levo-rotatory isomer of 1 - hydroxymethylene - 2 - keto - 4a - methyl - $\Delta^{3,6}$-hexahydronaphthalene in the presence of a catalytic amount of trimethyl benzyl ammoninum n-butoxide.

7. In the method of making the levo-rotatory isomer of trans - 1 - formyl - 1 - (3 - ketobutyl) - 2 - keto- 4a-methyl - $\Delta^{3,6}$ - hexahydronaphthalene the step which comprises reacting in an anhydrous inert organic solvent medium and at a temperature in the range of about 10 to 30° C. methyl vinyl ketone with the levo-rotatory isomer of 1 - hydroxymethylene - 2 - keto - 4a - methyl - $\Delta^{3,6}$ - hexahydronaphthalene in the presence of a catalytic amount of trimethyl benzyl ammonium n-butoxide.

8. In the method of making the levo-rotatory isomer of trans - 1 - formyl - 1 - (3,7 - diketo - 7 - methoxyheptyl) - 2 - keto - 4a - methyl - $\Delta^{3,6}$ - hexahydronaphthalene the step which comprises reacting in an anhydrous inert organic solvent medium and at a temperature in the range of about 10 to 30° C. the methyl ester of 5 - keto-6-heptenoic acid with the levo-rotatory isomer of 1-hydroxymethylene - 2 - keto - 4a - methyl - $\Delta^{3,6}$ - hexahydronaphthalene in the presence of a catalytic amount of trimethyl benzyl ammonium n-butoxide.

9. The process of claim 5 employing tert. butanol as the inert solvent.

10. The process of claim 6 employing tert. butanol as the inert solvent.

11. The process of claim 8 employing tert. butanol as the inert solvent.

References Cited in the file of this patent

UNITED STATES PATENTS

| | | |
|---|---|---|
| 2,617,828 | Sarrett et al. | Nov. 11, 1952 |
| 2,681,366 | Woodward | June 15, 1954 |
| 2,694,687 | Benneville et al. | Nov. 16, 1954 |

OTHER REFERENCES

Woodward: J. A. C. S. 74, 1952, p. 4227.